Figure 1:
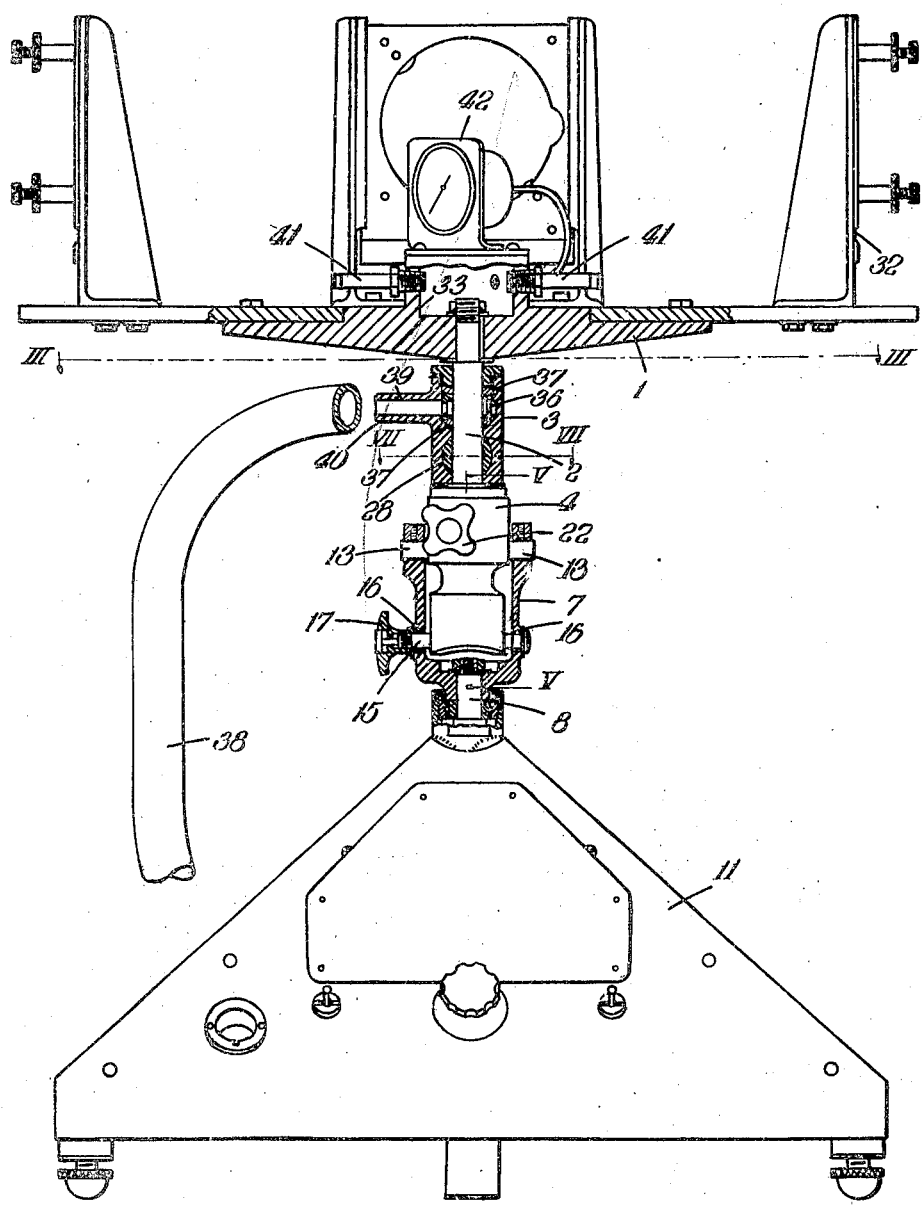

Dec. 6, 1949     J. AUSTIN     2,490,574
APPARATUS FOR TESTING GYROSCOPIC INSTRUMENTS
Filed Jan. 12, 1945     6 Sheets-Sheet 1

Inventor
John Austin
by Wilkinson & Mawhinney
Attorneys

Inventor
John Austin
by Wilkinson & Mawhinney
Attorneys

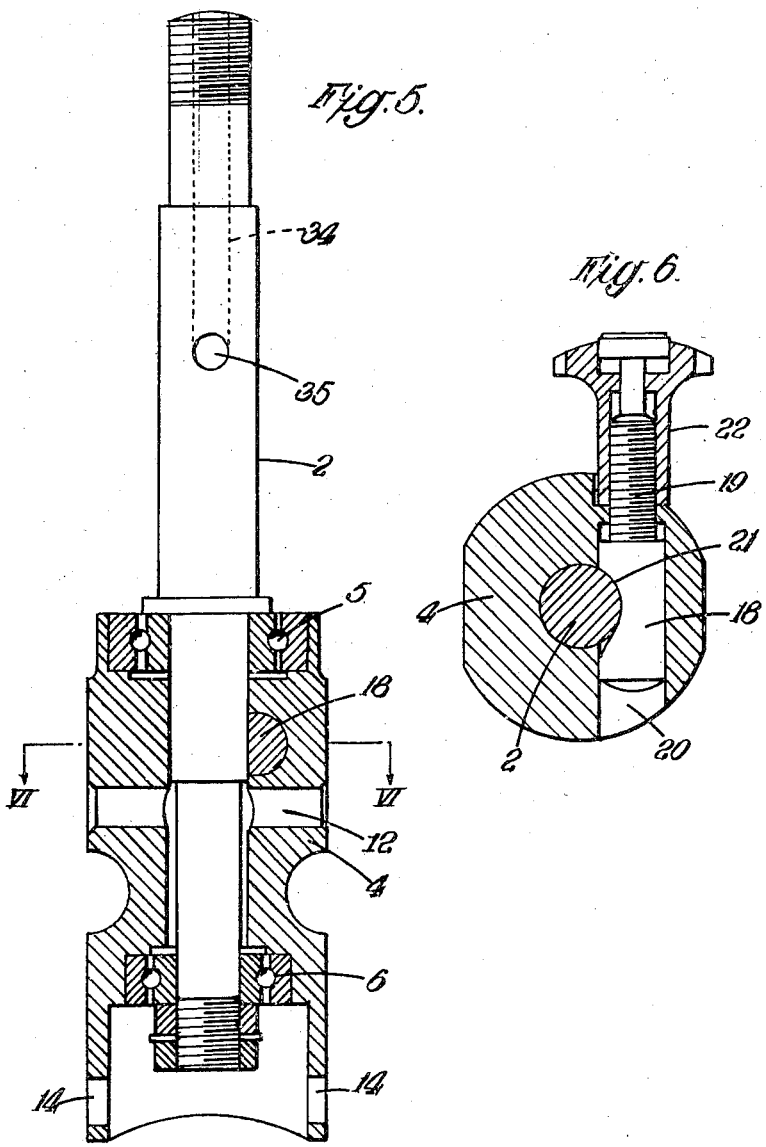

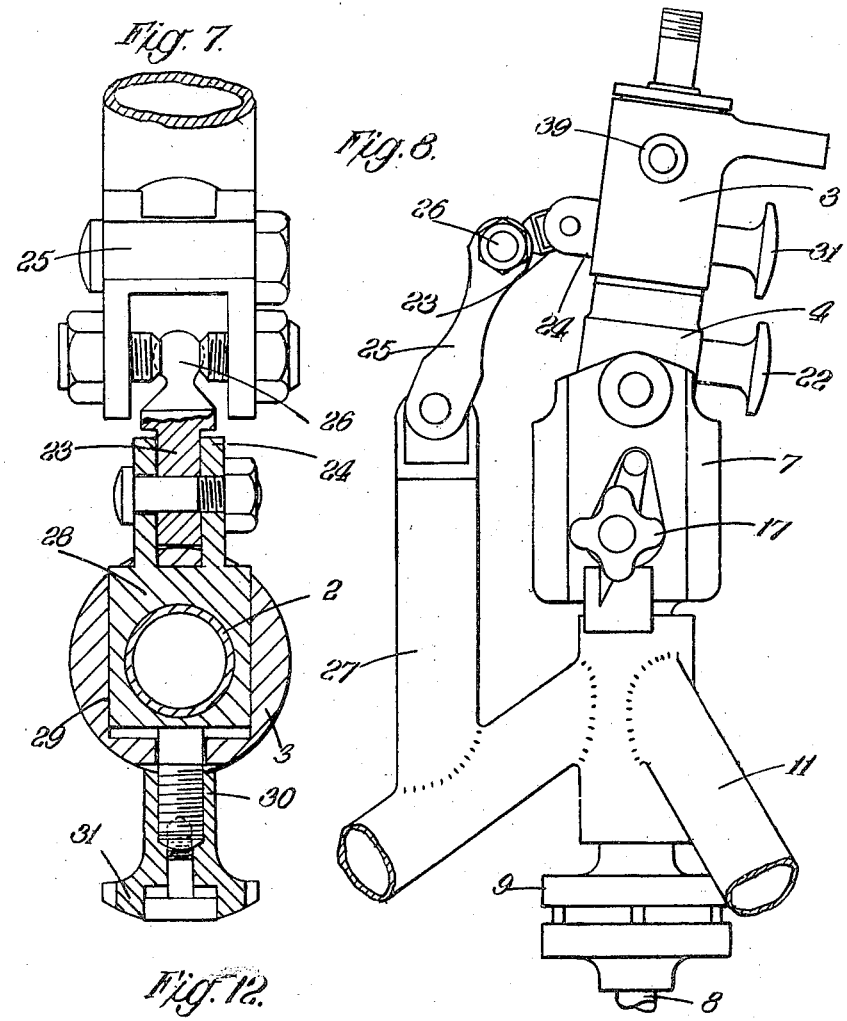

Dec. 6, 1949        J. AUSTIN        2,490,574
APPARATUS FOR TESTING GYROSCOPIC INSTRUMENTS
Filed Jan. 12, 1945        6 Sheets-Sheet 6
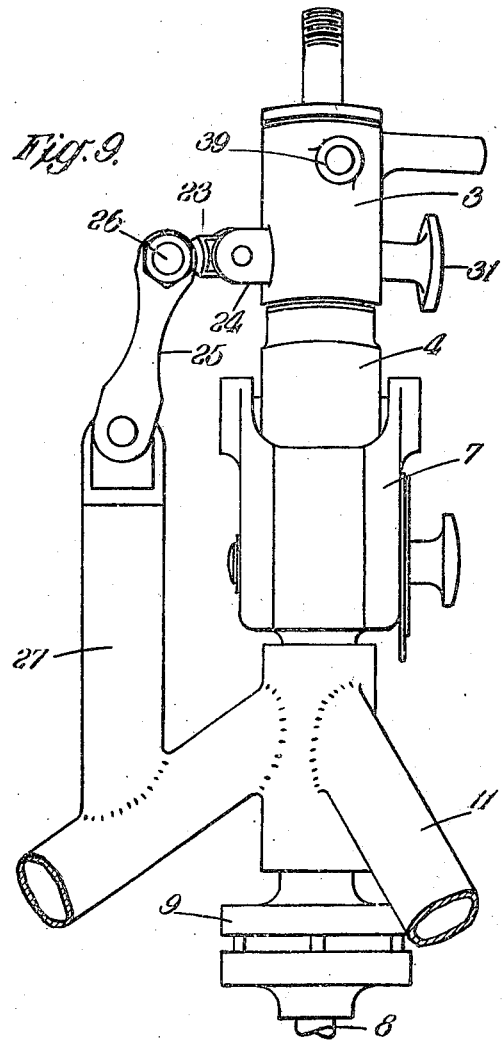
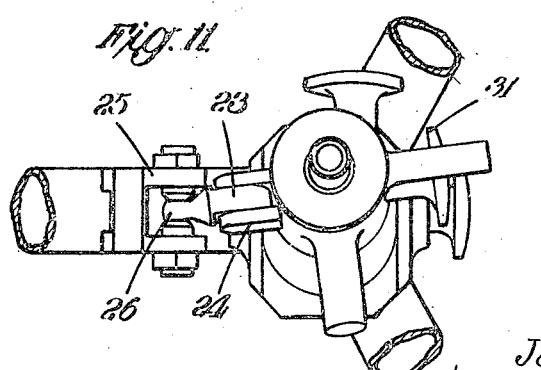
Inventor
John Austin
by Wilkinson & Mawhinney
Attorneys Patented Dec. 6, 1949

2,490,574

UNITED STATES PATENT OFFICE 2,490,574

APPARATUS FOR TESTING GYROSCOPIC INSTRUMENTS

John Austin, Beddington, England, assignor to Bryans Aeroquipment Limited, a British company Application January 12, 1945, Serial No. 572,515
In Great Britain January 24, 1944

11 Claims. (Cl. 73—1)

This invention relates to apparatus for testing gyroscopic instruments. What is necessary in such an apparatus is a mechanism which will subject the instruments to rolling, pitching and yawing motions simultaneously while maintaining a sub-atmospheric pressure in them, and it is highly desirable that the mechanism should also allow the instruments to be rotated in azimuth when desired.

The primary object of this invention is to produce a simple form of apparatus suitable for use on airports and service stations where it is enough to subject the instruments to definite and predetermined degrees of roll, pitch and yaw simultaneously in order to determine whether they are functioning correctly.

A further object of this invention is to produce such an apparatus by means of which the instruments can also be subjected to rotation in azimuth.

Yet another object is to produce an apparatus in which all the necessary controls are compactly arranged and easy to adjust.

In the present invention, a spindle supporting and secured to an instrument-carrying table or the like is mounted vertically above a driving shaft and carried in a bearing which is itself carried by the driving shaft and is or can be canted, that is to say angularly offset, relatively to the driving shaft. Thus as the driving shaft rotates, the bearing rotates around the table spindle and its centre line traces out a conical path. The table spindle is mechanically constrained to rock about its own axis when the bearing moves in this fashion. In consequence the table will be subjected to the desired motions in three planes at right angles to one another.

When, as is preferred, the apparatus is designed to permit rotation in azimuth, means must be provided for moving the bearing from its canted position into one of direct alignment with the driving shaft and locking it in that position so that it will rotate unrestrained with the driving shaft. Moreover, since in roll, pitch and yaw testing, the bearing turns around the table spindle, but for rotation in azimuth the two must turn together, means are provided in the preferred apparatus for locking the two together when desired.

Figure 2:
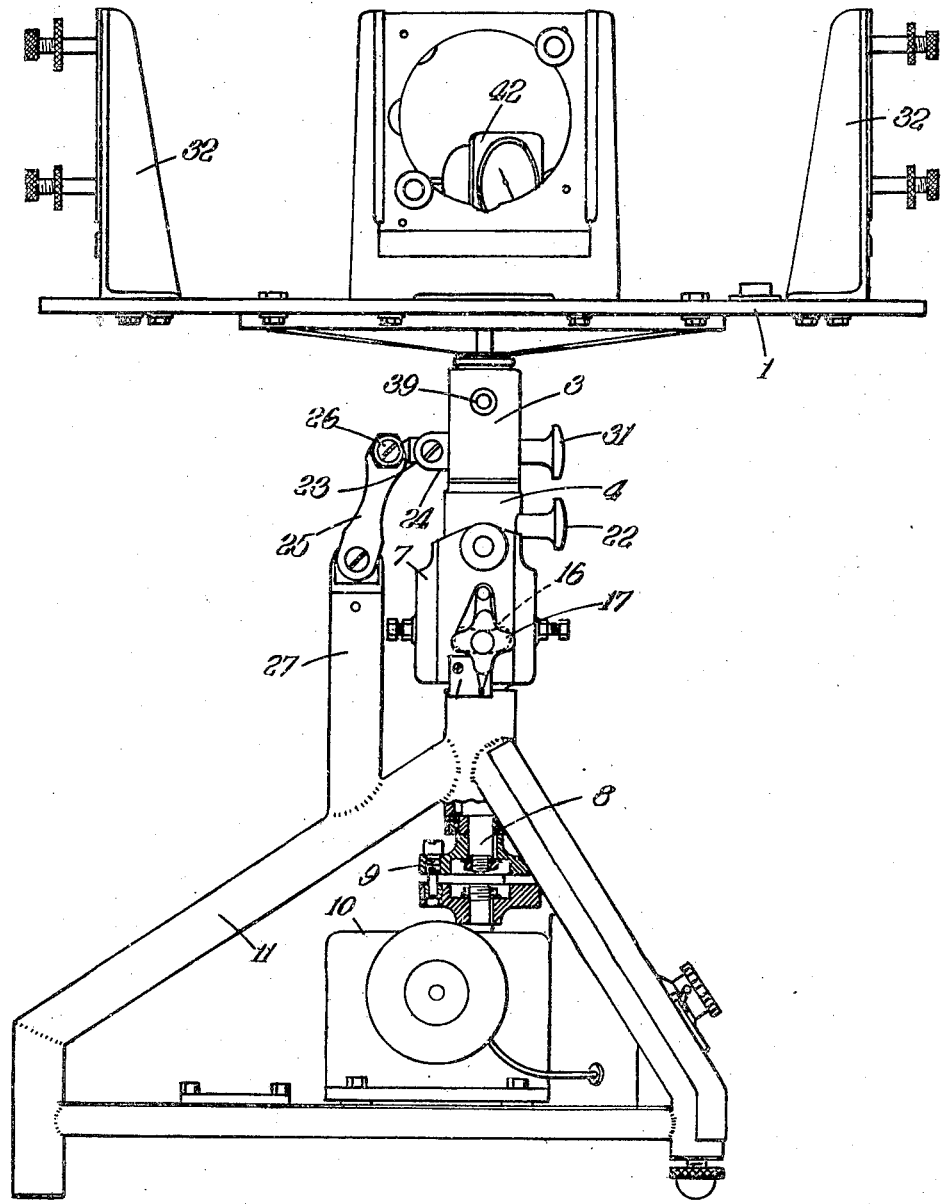
Figure 3:
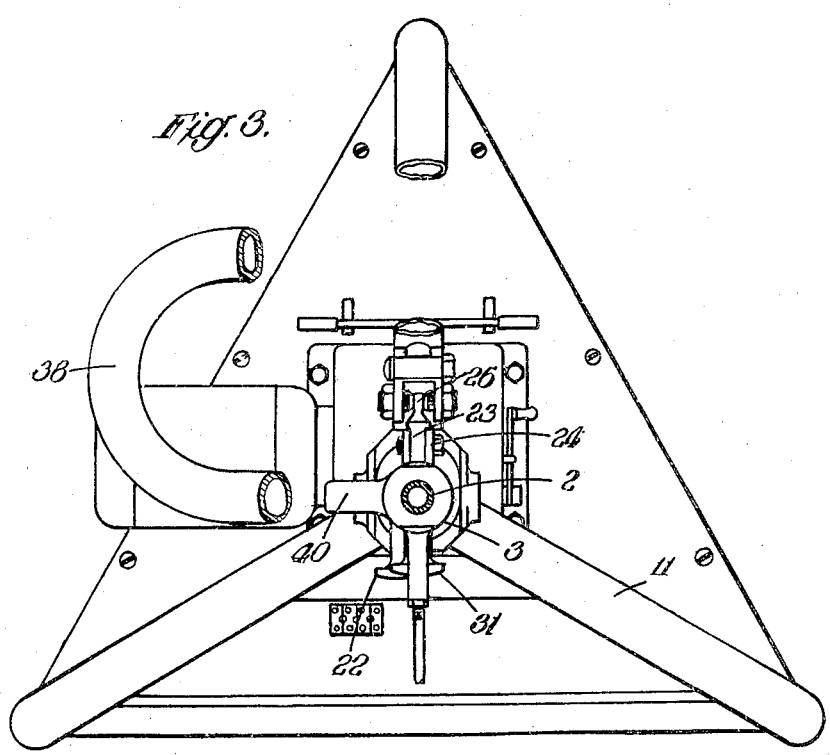
Figure 4:
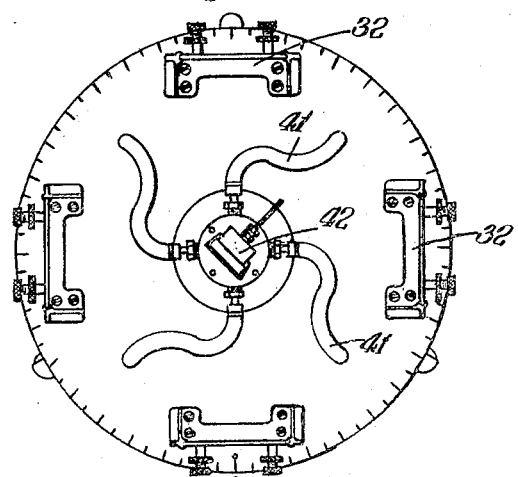

The invention will be best understood from the following description of the preferred embodiment, when read in conjunction with the accompanying drawings, in which:

Figure 1 is a front elevation of the apparatus, partly in section;
Figure 2 is a side elevation;
Figure 3 is a section on the line III—III in Figure 1;
Figure 4 is a plan and is on a smaller scale;
Figure 5 is a vertical section on the line V—V in Figure 1 and is on a larger scale;
Figure 6 is a section on the line VI—VI in Figure 5;
Figure 7 is a section on the line VII—VII in Figure 1;
Figures 8 and 9 illustrate two positions taken up by the apparatus in operation;
Figures 10 and 11 are plans corresponding to Figures 8 and 9 respectively; and
Figure 12 is an operational diagram.

The apparatus comprises essentially an instrument table 1 secured to the top of a table spindle 2 which is rotatably mounted in a gland sleeve 3. The spindle 2 is carried in a bearing block 4 through ball bearings 5 and 6, this block being tiltably mounted about a horizontal axis in a forked socket housing 7 which is fixed to a driving shaft 8. This shaft is driven through a flexible coupling 9 and gearing by an electric motor 10. The driving shaft 8 is carried in a supporting framework 11 which serves also to support the motor 10.

The housing 7 and the driving shaft 8 remain vertical at all times and are turned continuously in either direction about a vertical axis. The bearing block 4 is formed with sockets 12 which receive pivot pins 13 fixed in the two arms of the housing 7 so that the block can tilt about these pivot pins. In order to lock it in any desired position it is formed with a skirt in which there are two diametrically opposed openings 14 which receive a pin 15 which also passes through two arcuate slots 16 in the opposite walls of the housing 7. The pin is threaded at one end and receives an internally threaded cap 17 which can be tightened up to hold the pin in any desired position in the slots 16. Accordingly when the bearing block 4 is tilted about the pivots 13 after first loosening the cap 17 the pin 15 will move through the slots 16 carrying the lower end of the bearing block with it and then it can be locked in the desired position by tightening the cap 17 again.

For the purposes of locking the bearing block 4 and the table spindle 2 together for rotation of the table in azimuth a pin 18 with a threaded stem 19 is mounted to slide in a transverse bore 20 in the block 4 and is formed with a part-cylindrical groove 21 which fits around the table spindle 2 as shown in Figure 6. An internally threaded cap 22 engages the stem 19 and when the spindle 2 is to be locked to the block 4 the cap 22 is tightened to draw the pin 18 outwards and urge the spindle into close frictional contact with the wall of the axial bore in the block 4. When the apparatus is to be used for roll, pitch and yaw testing, the cap 22 is loosened and then the spindle 2, which makes a loose fit in the axial bore, can turn relatively to the block.

The gland sleeve 3 which surrounds the table spindle 2 is connected by a link 23, pivotally mounted at one end in forked arms 24 rigid with the sleeve, to an arm 25 through a ball joint 26 at the other end of the link 23. The second end of the arm 25 is pivotally mounted about a horizontal axis in a bracket 27 which extends upward from the framework 11. The sleeve 3 is normally free to turn relatively to the spindle 2 but can be locked to it. For this purpose an eye-bolt 28 is mounted to slide transversely in a bore 29 in the sleeve, the opening in the bolt surrounding the spindle 2. This bolt works in the same way as the pin 18 and it has a threaded stem 30 which is engaged by a screw-threaded cap 31 so that when the cap is tightened the bolt is moved transversely to pull the spindle 2 into close frictional contact with the sleeve 3. The bolt 28 is moved in the reverse direction to allow the table spindle to turn freely within the sleeve during testing by rotation in azimuth.

The table 1 is provided with four brackets 32 for the reception of instruments to be tested. During testing it is desirable to place the instruments under vacuum and to enable this to be done a vacuum manifold 33 is provided at the middle of the table 1 and the upper end of the spindle 2 enters this manifold. The spindle is bored axially as indicated in dotted lines at 34 in Figure 5, and at the bottom of the bore is formed with a radial opening 35 which registers with an annular cavity 36 in the sleeve 3. The cavity is closed above and below the opening 35 by land packings 37 and it communicates with a flexible pipe 38 through a bore 39 in a spigot 40 formed on the sleeve. This pipe leads to a suction pump not shown. When this pump is working air is drawn out of the manifold 33 so that suction is applied to four pipes 41 to which the instruments under test are respectively connected. A pressure gauge 42 is mounted on top of and connected to the manifold 33.

When the apparatus is to be used for roll, pitch and yaw testing the bearing block 4 is canted relatively to the housing 7 and locked in the canted position by cap 17, and the table spindle 2, being unlocked from the block 4, is locked to the sleeve 3. As the driving spindle 8 rotates the axis of block 4, spindle 2, and sleeve 3 will trace out a conical path and the constraint imposed by the linkage 24, 23, 26, 25 will prevent the sleeve 3 from rotating with the block 4, but since the arm 25 can rock in a vertical plane only, the link 23 is forced to change its angular position in a horizontal plane by rocking about the ball joint 26.

These changes cause the center line of the bearing block and spindle to trace out a conical path and the spindle is so constrained that its resultant motion when the driving shaft is rotated is compounded of the motion of its axis in the conical path and an oscillation about its own axis. One instantaneous position of the parts is shown in Figures 8 and 10 and as the rotation continues the parts will pass through the position shown in Figures 9 and 11 in which the shaft 8 has turned through 90° from the position shown in Figures 8 and 10.

The action is diagrammatically illustrated in Figure 12 in which four successive positions of the top of the table spindle 2 are shown at A, B, C and D, the corresponding positions of the ball joint 26 being shown at A', B', C' and D' and the fixed position of the swivel joint between the arm 25 and the bracket 27 being shown at E. In Figure 12 the positions A and A' correspond to those shown in Figures 8 and 10 and the positions D and D' to those shown in Figures 9 and 11.

When the instruments are to be tested by rotation in azimuth the bearing block 4 is locked to the spindle 2 and the sleeve 3 is unlocked from the spindle 2. The spindle 2 then turns freely about its own vertical axis within the sleeve 3.

It will be seen that the apparatus is very compact and that the distance between the top of the framework and the table is small and yet in it there are the controls which must be moved to change over from roll, pitch and yaw testing to azimuth testing, namely the nuts 17, 22 and 31.

What I claim is:

1. An apparatus for testing gyroscopic instruments by subjecting them to roll, pitch and yaw motions comprising an instrument support, a spindle secured to and extending downwards from said support, a driving shaft mounted to rotate below said spindle, a bearing for and rotatable about said spindle, said bearing being carried by and mounted to rotate with said driving shaft in a canted position relatively thereto, whereby the centre line of said bearing and spindle is caused to trace out a conical path, and means for so constraining the spindle that its resultant motion when the driving shaft is rotated is compounded of the motion of its axis in the conical path and an oscillation about its own axis.

2. An apparatus for testing gyroscopic instruments by subjecting them to roll, pitch and yaw motions comprising an instrument support, a spindle secured to and extending downwards from said support, a driving shaft mounted to rotate below said spindle, a bearing for and rotatable about said spindle, said bearing being carried by said driving shaft and movable between a canted position in which the centre line of the bearing and spindle traces out a conical path upon rotation of said driving shaft and a position of direct alignment with said driving shaft, and means for so constraining the spindle that its resultant motion when the driving shaft is rotated is compounded of the motion of its axis in the conical path and an oscillation about its own axis during canted rotation of said bearing.

3. An apparatus as defined in claim 1 in which the constraint is imposed on said spindle by a sleeve surrounding said spindle and locked to it during the canted rotation of said bearing, said sleeve being connected through a ball joint to an arm which is free to rock in a vertical plane only.

4. An apparatus for testing gyroscopic instruments by subjecting them to roll, pitch and yaw motions comprising a supporting framework, a driving shaft mounted to rotate about a vertical axis in said framework, a bearing rotated by said driving shaft and capable of being brought into direct alignment with it or canted relatively to it, a table spindle carried in said bearing, a sleeve surrounding said table spindle, means for selectively locking said sleeve to said spindle during canted rotation of said bearing, an arm pivotally mounted to rock in a vertical plane only, a ball joint interconnecting said sleeve and said arm, whereby the center line of the table spindle is caused to trace out a conical path and the table spindle is so constrained that its resultant motion is compounded of the motion of its axis in the conical path and an oscillation about its own axis during canted rotation of said bearing, and an instrument table supported by and secured to said table spindle.

5. An apparatus as claimed in claim 1 in which the constraint is imposed on said spindle by a sleeve surrounding said spindle and locked to it during the canted rotation of said bearing, said sleeve being connected through a ball joint to an arm which is free to rock in a vertical plane only and the table spindle is formed with a passage through which suction can be applied to a point on the table or the like for the purpose of placing the instruments under partial vacuum during the testing and the sleeve is formed as a gland through which a suction pipe may be placed in communication with the passage.

6. An apparatus as claimed in claim 1 in which said bearing is pivotally mounted in a socket housing carried by said driving shaft and means are provided for locking it in different angular positions in said housing.

7. An apparatus as claimed in claim 4 wherein the means for locking said sleeve to said table spindle consists of a frictional grip device.

8. An apparatus for testing gyroscopic instruments by subjecting them to motions similar to those in actual use, comprising an instrument support a spindle secured to and extending downwards from said support, a driving shaft mounted to rotate below said spindle, a bearing for and rotatable about said spindle, said bearing being carried by said driving shaft in a canted position in which its center line traces out a conical path upon rotation of said driving shaft, and means for locking said spindle to said bearing to enable the instrument support to be rotated in azimuth.

9. An apparatus as claimed in claim 8, wherein said locking means consist of a frictional grip device.

10. An apparatus for testing gyroscopic instruments by subjecting them to motions similar to those encountered in actual use comprising a supporting framework, a driving shaft rotatable in said framework about a vertical axis, a bearing pivotally mounted on said shaft for canting relatively thereto, means for locking said bearing in direct alignment with the shaft, a table spindle carried in said bearing, a sleeve surrounding said spindle and constrained from rotating with said bearing, an instrument table supported by and secured to said spindle, and means for selectively locking said spindle to said bearing for rotating said table in azimuth.

11. An apparatus for testing gyroscopic instruments by subjecting them to motion similar to those encountered in actual use comprising an instrument support, a spindle secured to said support, a bearing for and rotatable about said spindle, a driving shaft for said bearing, means for selectively aligning the bearing with said shaft or canting the bearing relative to said shaft, whereby the center line of the bearing and spindle is caused to trace out a conical path when the bearing is canted relative to the shaft, releasable means for so constraining the spindle that its resultant motion is compounded of the motion of its axis in the conical path and an oscillation about its own axis when the bearing is canted relative to the shaft and the shaft is rotated, and releasable means for locking said bearing to said spindle in both its aligned or canted relation to said shaft, whereby the instrument support is rotated in azimuth upon release of the constraining means.

JOHN AUSTIN.

REFERENCES CITED

The following references are of record in the file of this patent:

UNITED STATES PATENTS

| Number | Name | Date |
|---|---|---|
| 1,330,801 | Greenberg | Feb. 17, 1920 |
| 1,560,435 | Sperry | Nov. 3, 1925 |
| 2,216,764 | Clark | Oct. 8, 1940 |
| 2,366,266 | Kallenbach | Jan. 2, 1945 |

FOREIGN PATENTS

| Number | Country | Date |
|---|---|---|
| 526,279 | Great Britain | Sept. 13, 1940 |
| 558,374 | Great Britain | Dec. 3, 1944 |